Inventor
Alois Moosmann
By
Watson, Cole, Grindle & Watson
Attys.

3,347,253
JET CONTROL FOR MACHINE TOOLS OR THE LIKE
Alois Moosmann, 11 Muttergartenweg,
Stuttgart-Birkach, Germany
Filed June 16, 1964, Ser. No. 375,606
Claims priority, application Germany, June 19, 1963,
M 57,228
1 Claim. (Cl. 137—83)

The invention relates to a pressure fluid control and preferably to a pneumatic control for machine tools or the like with a jet control in which between two supply nozzles and two receiving nozzles arranged opposite to them a mobile control vane is arranged. This jet control is destined particularly for use with copying controls of machine tools.

In the fully or partially automatic sequence of operations of machine tools the problem must be solved to determine very small deviations of the actual value from the rated value and to transform them in sufficiently great control pulses for eliminating the possible deviations. According to the type of operation dimension deviations of one or a few thousands of a millimeter must be determined perfectly and be transmitted as pulses.

For the solution of this problem compressed air with a low pressure of about 0.10 to 0.60 atü. is particularly suitable if it blows from supply nozzles with a sufficiently high speed over a slot into opposite receiving nozzles and creates there a statical pressure acting on membranes or the like of a control motor, e.g. a turbine operated by pressure oil working with the hydrodynamic energy of an oil jet. Such a turbine needs, for starting in the one or the other direction for correcting, a dimension deviation by shifting a carriage or the like a pressure differential of a few millimeters water-column between two membranes arranged opposite to each other and acting on the control member of the turbine. Suitably the pressure on the one membrane is increased and simultaneously diminished on the opposite membrane in order to obtain the greatest possible difference. In control motors working with statical oil pressure as e.g. piston- and cylinder- or piston-oil motors with rotating power output the control takes place by means of axially shiftable control pistons. These may likewise be shifted by a pressure differential on two membranes opposite to each other or the like and may thus be brought to the desired control effect.

In the case of control motors working with statical oil pressures the appertaining axially shiftable control piston is operated mechanically, pneumatically or by electric lifting magnets. The mechanical operation is useful, because of the missing of a pulse amplification when the piston is shifted merely by the deviation of the actual value from the real value only for relatively small exactitudes of the piece to be machined. It has, besides, the disadvantage that it exerts a relatively great pressure on the measuring surface operating it, e.g. a pattern, a model or the like.

Solutions have become known on pneumatic basis which work with means known generally in the regulating technique as nozzle and baffle plate, control vane, control piston in a bore or the like. These measuring controls make possible, indeed, a higher exactitude than the purely mechanical controls, but they are not sufficient for the highest possible exactitude because up to now they are not sufficiently responsive.

The electrically respectively electronically working systems have always the disadvantage of a very great expenditure and therewith of a correspondingly high price. Besides they are very sensitive for the rough operation in the shops and, therefore, subject to trouble.

It is the purpose of the invention to eliminate the drawbacks of the known controls in a simple manner and to reach, besides, a greater exactitude and sensitiveness.

The invention consists essentially in the fact that the control edges of the control vane are arranged in the same direction and co-operate with pairs of supply and receiving nozzles which are arranged and configurated in such a way that the control edges in case of a control movement of the control vane direct the pressure means jet coming out of a supply nozzle from a direction into the open air into the appertaining receiving nozzle and, on the other hand, the pressure means jet directed from the other supply nozzle into the appertaining receiving nozzle from this receiving nozzle into the open air and vice-versa.

The control edges of the control vane may, in this case, be in one line, while the supply nozzles are off-set from the receiving nozzles or the control edges of the control vane are off-set from each other, while the supply nozzles are directly opposite to the receiving nozzles.

Preferably the supply and receiving nozzles according to the invention have a nozzle section of large width, but a small height generating a correspondingly flat pressure means jet, whereby the width of the appertaining control edge of the control vane has at least the width of this flat pressure means jet.

According to a further essential feature of the invention the arrangement is made in such a way that the control edges of the control vane are moved essentially vertically to the direction of the pressure means jet, coming out of the supply nozzles into the said jet and thus divert a part of the jet in such a way approximately normally to the direction of the main jet, that the main jet is deviated by the reaction power of the normally diverted part of the jet from its original direction into the desired direction.

A practical embodiment of such a pneumatic control can be obtained in different manners. According to a particularly advantageous embodiment the supply nozzles and the receiving nozzles are arranged on the periphery of a hollow and at least partially round nozzle body in an approximately tangential manner, whereby the control vane is movable within the space between the supply and receiving nozzle about radially to the nozzle body.

By the invention it is obtained that the responsiveness of a control system, particularly a scanning system with jet control is increased so far that also deviations of the actual value from the rated value of one thousandth of a millimeter are perfectly determined and transmitted to the control motor with sufficiently strong pulses. The transfer speed of the pulse is in this connection approximately similar to the speed of sound. It avoids to a great extent the draw-backs of the known systems.

In the drawing the invention is illustrated on the basis of an embodiment for a copying control.

Figure 1:
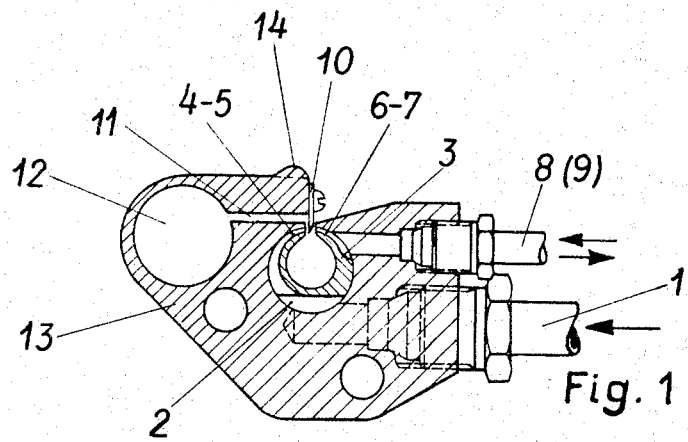
FIG. 1 shows the pulse-giving control device in longitudinal section.
Figure 2:
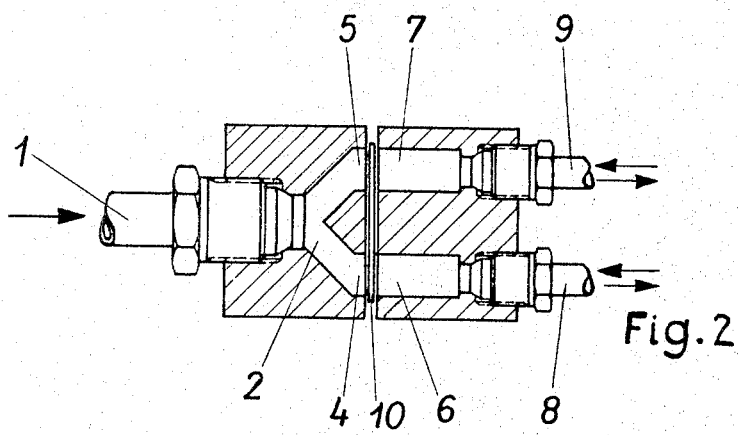
FIG. 2 shows the control device developed in the direction of the air flow.
Figure 3:
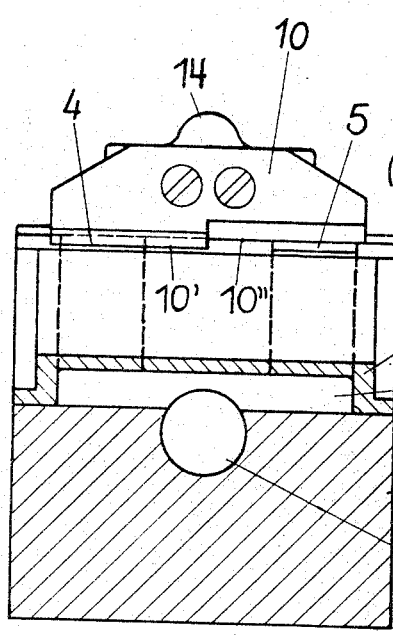
FIG. 3 shows the control device in transverse section in double scale.

In the control device shown in FIGS. 1 to 3 compressed air streams with a nearly constant pressure which can be regulated between .10 and .60 atü. through a connection 1 into a distribution space 2 on a hollow essentially round nozzle body 3, from where it is distributed to the two supply nozzles 4 and 5. Through these latter it flows into the two receiving nozzles 6 and 7 and thus acts on the appertaining pulse conduits 8 and 9 which lead to the two membranes or other pulse-sensitive organs of the control motor controlled by the control device by means of a pressure differential.

A control vane 10 with control edges 10', 10", arranged between the supply nozzles 4 and 5 respectively and the receiving nozzles 6 and 7 respectively is fixed on a yoke 14 arranged as a feeler lever and separated partially from the main body 13 by a slot 11 and a bore 12. By this separation from the main body 13 the feeler lever 14 is configurated elastically in relation to the main body, so that the control vane can make movements.

Figure 4:
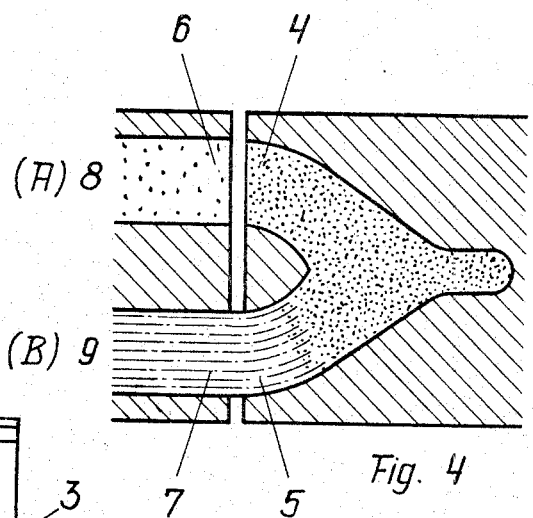
FIG. 4 shows diagrammatically the two air currents A and B without any influence on them by the control vane.
Figure 7:
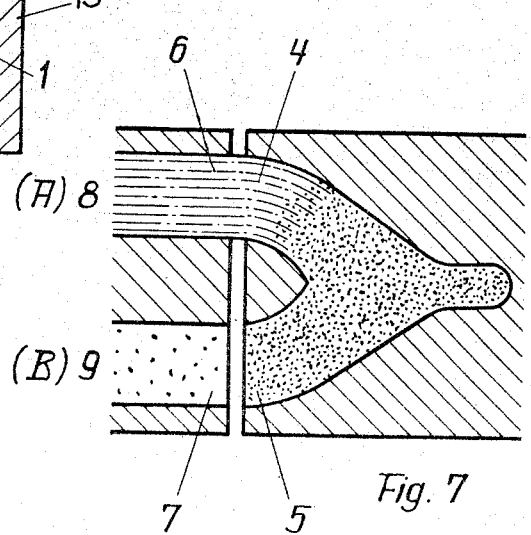
FIG. 7 shows diagrammatically the two air streams A and B influenced by the control vane.
Figure 5:
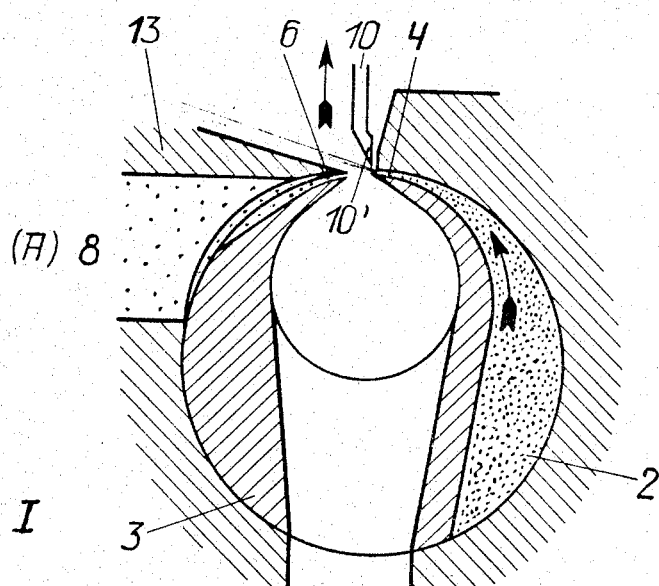
FIG. 5 shows the air flow A without any influence on it by the control vane, seen in transverse section.
Figure 8:
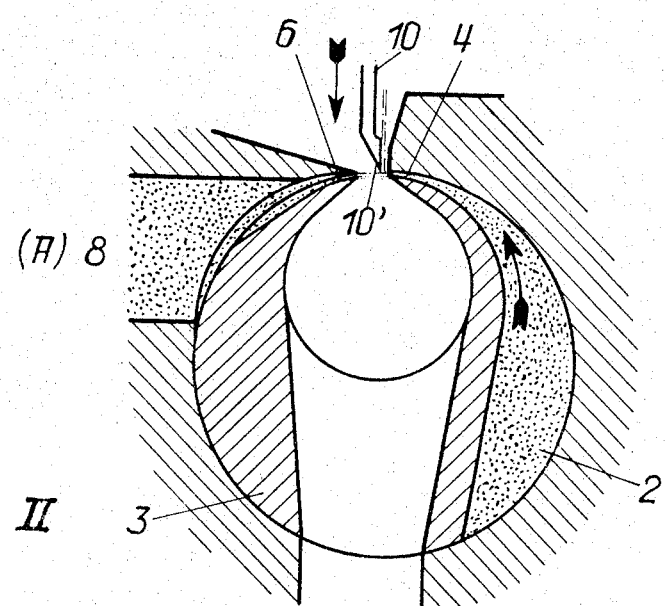
FIG. 8 shows the air stream A influenced by the control vane, in transverse section.
Figure 6:
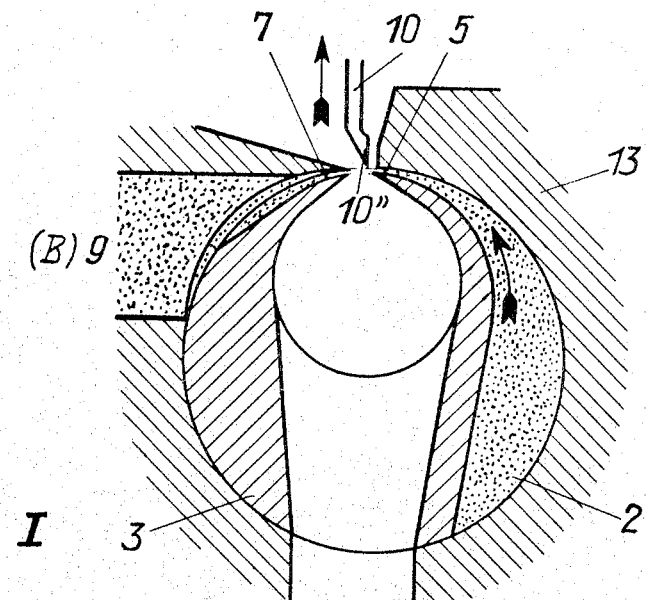
FIG. 6 shows the air stream B without any influence on it by the control vane, in transverse section.
Figure 9:
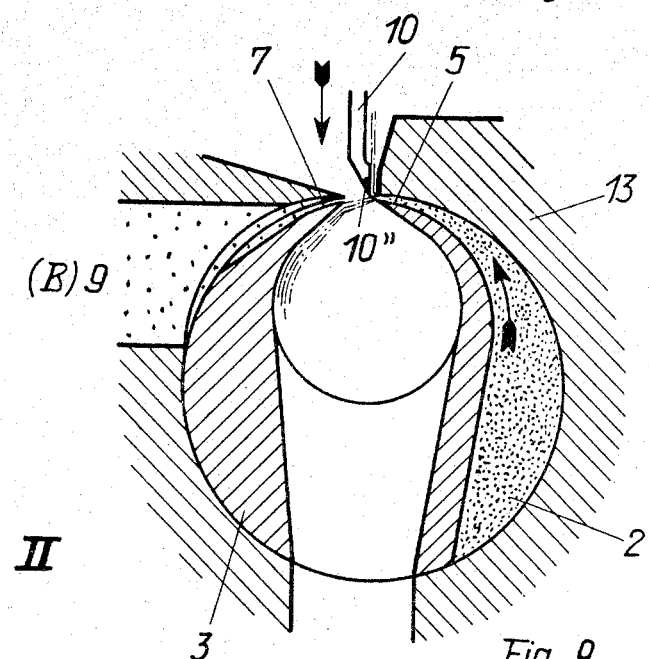
FIG. 9 shows the air stream B influenced by the control vane, in transverse section.

FIGS. 4 to 9 show diagrammatically details of the air flow at the nozzles. While FIGS. 4 and 6 show the air jets between the supply nozzles 4 and 5 respectively and the receiving nozzles 6 and 7 respectively without any influence on them by the control vane 10, the streams are shown in FIGURES 8 and 9 with influence by the control vane 10. To show the situation more clearly FIGS. 5 and 6 are associated with position I of the control vane and FIGURES 8 and 9 are associated with the position II of the control vane. Both positions are extremes which never happen practically, e.g. when copying, and the function takes place generally within the middle of the two extreme positions I and II.

As is shown in FIG. 5 the supply nozzle 4 is configurated in such a way that the air jet streams along the oblique surface of the main body 13 into the open air. According to FIG. 6 the supply nozzle 5 is configurated, on the contrary, in such a way, that the air jet is directed into the receiving nozzle 7. With the position I of the control vane the connection 8 has no pressure and the connection 9 is under pressure.

According to FIG. 8 the air jet is influenced by the control vane 10 in such a maner that it is directed into the receiving nozzle 6. According to FIG. 9 the influence on the air jet by the control vane 10 has the consequence that the air jet is deviated past the receiving nozzle 7 through the interior of the hollow nozzle body 3 into the open air. With the control vane position II the connection 8 is under pressure, while the connection 9 is without pressure.

The deviation of the air jet under the influence of the control vane 10 is reached by the fact that, when touching the air jet with the cutting edge or control edge 10' and 10" respectively of the control vane 10 a small part is separated from the transverse section of the main air jet and is deviated by an angle of about 90°.

The reaction power of the deviated part of the jet causes a deviation of the main jet from its original direction. If e.g. one tenth of the transverse section of the jet is deviated by the cutting edge or control edge of the control vane 10 there is already reached a deviation of the main jet by 6.5° as compared with the original direction. For purposes of the present invention a fraction of this angle is generally already sufficient.

In order to obtain a separation of the said fraction of the jet already with a small movement of the control vane, the width of the jet is made as large as possible, e.g. 10 mm., and its height as small as possible, e.g. 0.20 mm. In this manner a great pressure differential is created in the receiving nozzles already with a movement of the control vane of only .001 mm.

The measure to guide the air jet as shown in FIG. 5 in a not influenced state past the receiving nozzle into the open air and to feed it according to FIG. 6 directly into the receiving nozzle 7 makes it possible to act upon the control vane 10 on its complete surface in the same direction through the frictional powers of the fraction of the jet on the surface of the control vane and to obtain thus a completely uniform penetration into the air jet.

The invention is, of course, not limited to the embodiment described hereinbefore and shown in the drawing, but it comprises all the modifications within the scope of the essential inventive idea. As a pressure means air is used preferably, without excluding by this statement any other suitable pressure means. The control principle of the pneumatic control according to the invention can be used, by the way, not only for copying controls, but also for controlling other components of machine tools or other machines.

What is claimed is:

A pneumatic control comprising a body having two supply nozzles and two receiving nozzles, one of said supply nozzles being in line with its associated receiving nozzle and arranged to direct a fluid stream into its associated receiving nozzle and the other of said supply nozzles being out of line with its associated receiving nozzle and arranged to direct a fluid stream adjacent its associated receiving nozzle, a control vane associated with said body and arranged for simultaneous movement of a pair of control edges between said supply and receiving nozzles, the arrangement being such that initial movement of said control vane in a straight line in a direction normal to said nozzles causes the control vane to act simultaneously on both fluid streams in order to obtain the difference in the control impulses, said supply and receiving nozzles having greater width than height, the control edges having at least the same width as the nozzles and arranged for movement in the direction of the height, said supply and receiving nozzles being arranged tangentially opposite each other on the periphery of a hollow at least partially round nozzle body and the control vane is movable in the space between the supply and receiving nozzles radially to the nozzle body.

References Cited

UNITED STATES PATENTS

| 2,297,448 | 3/1946 | Todd | 137—83 |
| 3,082,781 | 3/1963 | Moosmann | 137—83 |
| 3,223,103 | 12/1965 | Trinkler | 137—83 |

FOREIGN PATENTS

| 673,159 | 10/1929 | France. |
| 689,814 | 6/1930 | France. |

ALAN COHAN, *Primary Examiner.*